United States Patent [19]

Krämer et al.

[11] 3,909,058
[45] Sept. 30, 1975

[54] ENERGY-ABSORBING VEHICLE BODY END STRUCTURE

[75] Inventors: Friedhelm Krämer, Hochheim; Klaus Brunk, Rüsselsheim (Main), both of Germany

[73] Assignee: General Motors Corporation, Detroit, Mich.

[22] Filed: Nov. 23, 1973

[21] Appl. No.: 418,768

[30] Foreign Application Priority Data
Nov. 29, 1972 Germany............................ 2258290

[52] U.S. Cl............. 296/28 R; 180/69 C; 180/112; 188/1 C; 213/1 A; 293/63; 296/31 P; 296/35 B; 296/76
[51] Int. Cl.............................................. B62d 27/00
[58] Field of Search ........ 296/28 R, 28 K, 31 P, 76, 296/35 B; 180/69 R, 69 C, 112, 91, 103, 89 R; 213/1 A, 70; 293/1, 60, 63; 188/1 C

[56] References Cited
UNITED STATES PATENTS

| | | | |
|---|---|---|---|
| 2,793,971 | 5/1957 | Collins et al. ................. | 296/31 P X |
| 2,896,735 | 7/1959 | Bohn................................. | 293/63 X |
| 3,709,316 | 1/1973 | Glance.......................... | 296/28 R X |
| 3,747,915 | 7/1973 | Hall ................... | 293/70 X |
| 3,791,692 | 2/1974 | Piere ..................... | 296/31 P |
| 3,802,727 | 4/1974 | Beckley ...................... | 293/60 |

*Primary Examiner*—Robert J. Spar
*Assistant Examiner*—Donald W. Underwood
*Attorney, Agent, or Firm*—H. Furman

[57] ABSTRACT

Elongated hollow structural energy-absorbing parts lying in a fore-and-aft direction are disposed closely adjacent and parallel on the engine hood or luggage compartment lid, and on the body, so that under impact conditions these parts collapse in associated manner, so that the hood or lid contributes to absorbing impact energy without material distortion from its normal plane, while remaining closed. There is provision for relative displacement involving a wedging action, between the hollow parts on the hood or lid and those on the body.

3 Claims, 12 Drawing Figures

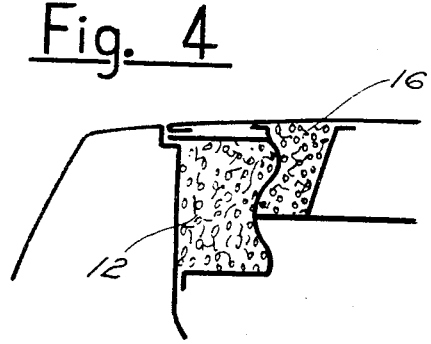
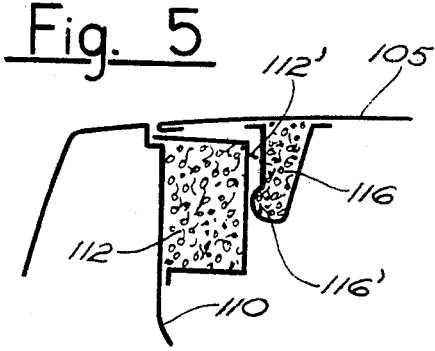
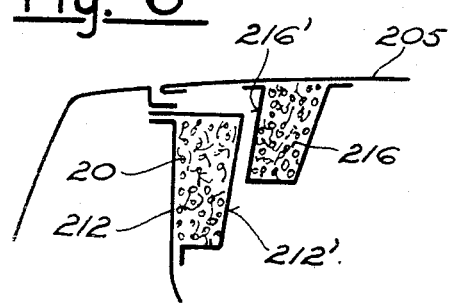
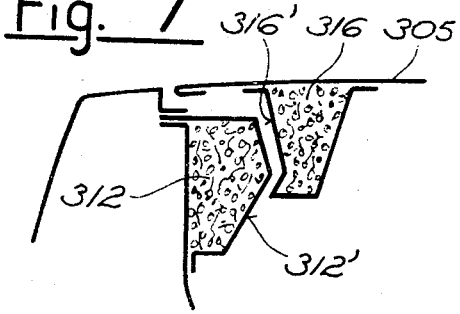
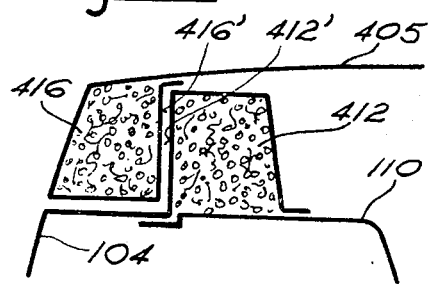
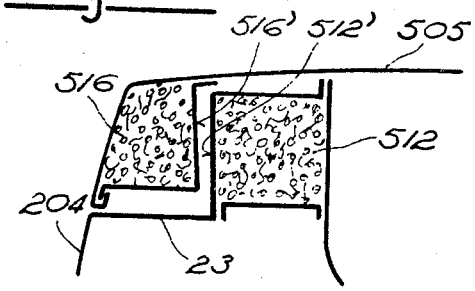
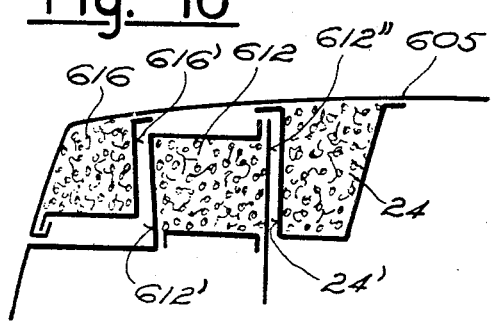
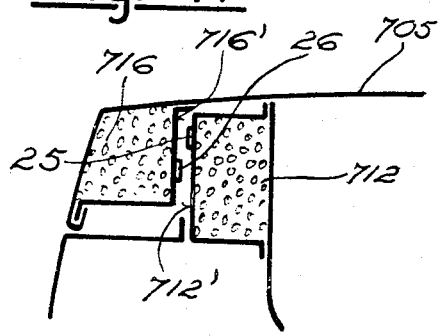

ENERGY-ABSORBING VEHICLE BODY END STRUCTURE

This invention relates to vehicle body end structures which are capable of absorbing energy under compressive stress during collision accidents.

Such end structures can be the forward or rear structures, which form the so-called "collapse zones" of the vehicle, lying in front of or behind a relatively pressure-resistant occupant cell.

The object of the invention is to render possible constructions in which the bonnet or hood (i.e. the engine compartment lid) or the luggage compartment lid can contribute to energy absorption to an increased degree, while avoiding the distortion of these parts substantially out of their constructional plane.

A specific construction according to the invention has the advantage, which is explained in terms of the front end of the vehicle but which is similar for the rear end: that the engine compartment bonnet or lid, under compressive stress caused for example by a frontal collision is displaced relative to the direction of travel, and a wedging action occurs between it and the compartment such that the lid undergoes energy-absorbing deformation while remaining in closed position.

Further details and advantages of the invention are given in the following constructional examples, which are shown in the drawings and further described below.

In the drawings:

FIG. 4 shows the "intermeshing" effect of two neighbouring hollow components by comparison with the area A in FIG. 2;

FIGS. 5, 6, 7 are schematic showings of various cross-sectional shapes of hollow components on a vehicle only partly indicated, with an engine bonnet arranged between the wings;

FIGS. 8, 9, 10, 11 are further schematic showings of various cross-sectional shapes of neighbouring hollow components on a vehicle only partly indicated, with the bonnet spanning the wings and closing against the outer surface of the body.

Figure 1:
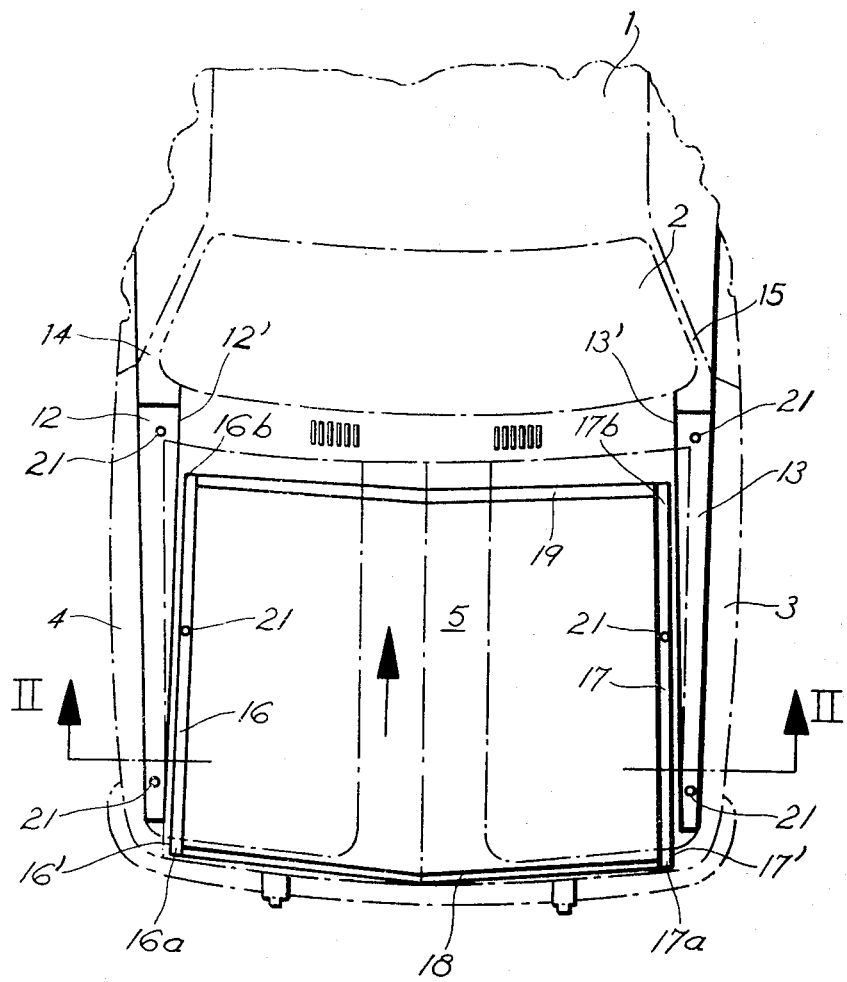
FIG. 1 is a schematic plan view of the front end of a passenger vehicle.
Figure 2:
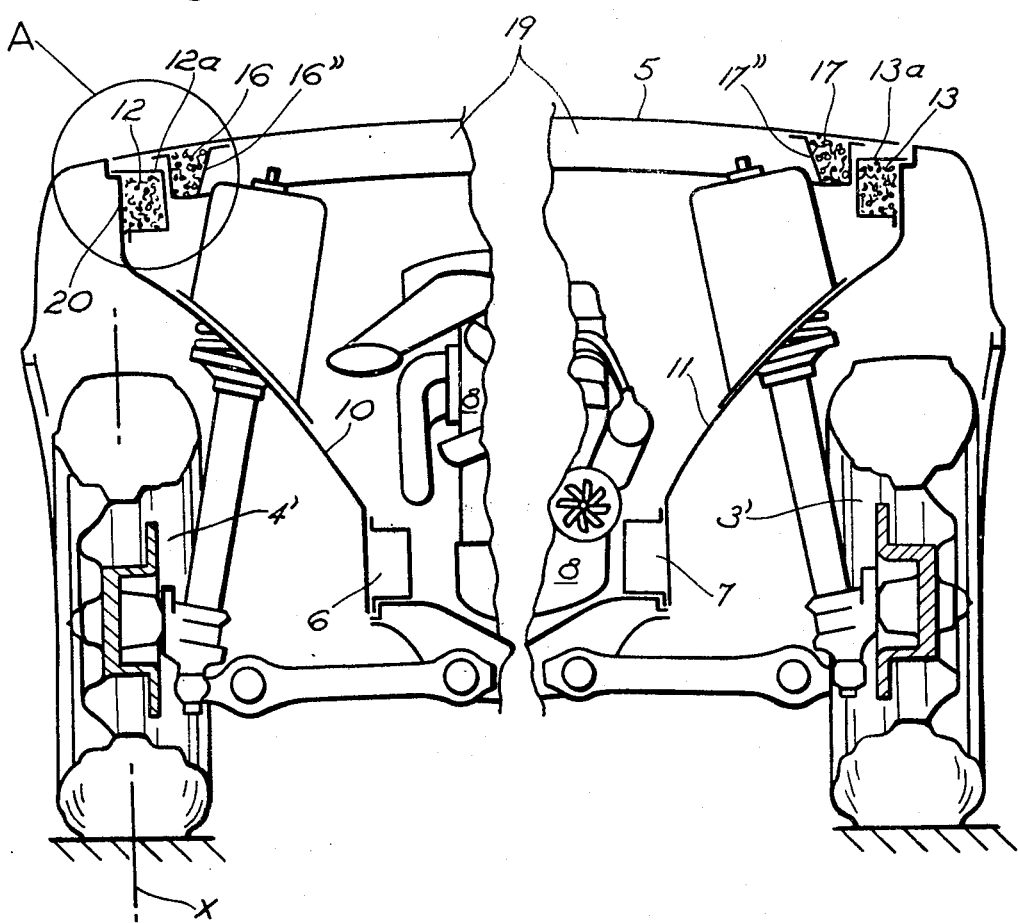
FIG. 2 is a section on line II—II in FIG. 1.

In the vehicle body shown in FIGS. 1 and 2, reference numeral 1 denotes the vehicle roof, 2 the front pane, 3 and 4 (as seen in the direction of travel) the forward left and right-hand wings, with the wheels 3', 4', and the engine bonnet 5. Numerals 6 and 7 denote the two side members of the frame and 8 designates the engine. The wheel arches 10 and 11 form the side walls of an engine compartment, at the top of which there are girder-like hollow components 12, 13 of polygonal cross-section, running in the fore-and-aft direction, and which in this case are each partially formed by the wheel arch. An additional plate 12a or 13a angled-over into a "U" forms with the wheel arch a square-section girder which is filled with hard polyurethane foam. The engine compartment is closed by the bonnet or hood 5, already mentioned, which forms a lid. Each hollow component 12, 13 (appropriately supported at the forward roof pillar 14, 15) is made wedge-shaped with the wedge thickness increasing in the direction opposite to the direction of travel. On the inner face of the bonnet 5 turned towards the engine compartment there are also two girder-like hollow components 16, 17 filled with plastics foam which are secured, at slight parallel spacing, directly alongside the body-side hollow components 12, 13. Each of them is partially formed by the engine bonnet and constitutes a square-section girder, in conjunction with a substantially U-shaped sheet-metal longitudinal section 16'', 17'' welded to the bonnet. The front and rear ends of the hollow components 16, 17 are cross-connected in each case by a hollow profiled section 18, 19 and the arrangement is so made that the front ends 16a, 17a of the hollow components 16, 17 protrude somewhat beyond the hollow components 12, 13 whilst (seen in the direction of travel) their rear ends 16b, 17b are set back with respect to the rear ends of the components 12, 13. The engine bonnet is locked, in a manner known per se (not illustrated in detail).

The hollow components 12, 13, 16, 17 are filled with plastic foam 20 in a known manner by introducing the ingredients of a cross-linked hard foam, together with any additions, into an aperture in the component which can be closed later. The production circumstances determine the actual stage in the manufacture of the bodywork at which the foaming takes place. The location of the particular hollow component during foaming, determines the position of the aperture for introducing the foam 20. In FIG. 1, the corresponding apertures are indicated schematically at 21. They are situated at the most appropriate place and after introduction of the plastics mass they are closable by a plug, also of plastics material. The weight per unit of volume for the polyurethane foam is preferably between 75 and 200 kg/m$^3$, for example 150 Kg/m$^3$. A sheet-metal thickness of between 0.5 and 1.5 mm thick, for example 1 mm, is chosen for the hollow structural components. By weight per unit of volume is meant both the freely foamed volumetric weight as well as that of shape-foamed plastics material. The free foaming determines the lower weight per unit volume, whilst the shape-foamed weight is higher because of the compression caused by the resistance of the sheet-metal casing. Both volumetric weights are of importance because even already-foamed plastics material (e.g. in the form of small particles, e.g. as a granulate) can be introduced into the hollow component. Of course, a composition consisting of such small particles needs suitable binding, for example on a plastics base. Besides plastics however, any other substance having similar properties may be used as a material for filling into the hollow structural components provided that it has the appropriate hardness.

Figure 3:
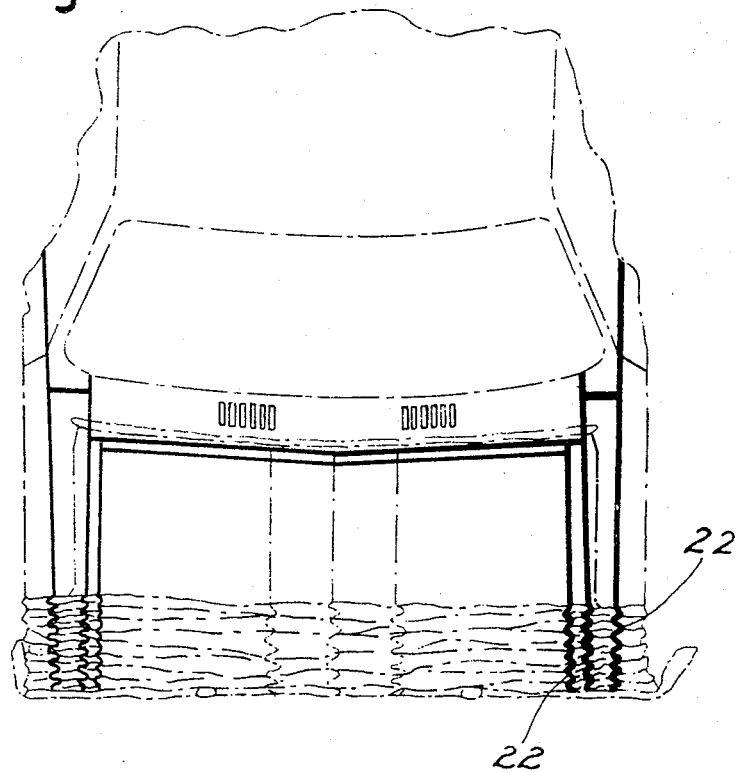
FIG. 3 is a schematic plan similar to FIG. 1, in the deformed condition of the vehicle after a collision.

The effect resulting from filling the hollow components with foam is that these components collapse uniformly and progressively from their extremities exposed directly to the effect of force, e.g. when a force action takes place in lingitudinal direction during a collision accident. This is because they possess a uniform deformation resistance over their entire stressed structural length. The reason for this uniform collapse and for the resulting uniform energy conversion is that, after the commencement of the external force action and the inward compression of the hollow components, the foam then exerts an outwardly direct pressure on the walls surrounding it. This creates a stabilized, i.e.

relatively uniform, folding 22 of the hollow components as shown for example in FIG. 3 illustrating an example of a vehicle deformed in its forward portion by impact. Of course this folding is initiated when, and only when, due to the external action of impact energy, the bonnet 5 together with its hollow components 16, 17 is displaced contrary to the direction of travel (arrow direction FIG. 1). Meanwhile the outer faces 16', 17' of the hollow components 16, 17 first of all establish frictional contact with, and finally with the progress of the energy action, a positive connection with, the inner faces 12', 13' of the bodywork-side hollow components 12, 13 thus leading to an intimate intermeshing action as illustrated in FIG. 4. This positive intermeshing of mutually adjacent parts finally brings about their common collapse 22 as shown in FIG. 3 and keeps the bonnet closed during the entire course of the deformation process so that the bonnet participates in this energy conversion action.

FIGS. 5 to 7 show different cross-sectional forms of hollow structural components functioning in accordance with the invention. For the sake of simplicity they illustrate only one hollow-component pair, analogous with the presentation in FIG. 4, but in the "unmeshed" condition, i.e. undeformed. For identical or corresponding parts — and this applies to FIGS. 8 to 11 also — the reference numerals are appropriately stepped up by 100 in each case.

The foam filled hollow structural component 112 which is wedge-shaped in longitudinal direction and is secured to the wheel arch 110, is assigned a similarly foam filled adjacently parallel hollow component 116 arranged on the bonnet 105 and provided with a bead 116' fashioned-on over its entire length. During the mutual positive wedging of the two hollow components under a compressive stress, this leads to a particularly intimate "meshing" together with the component face 112', and therefore of the two components.

In FIG. 6, the adjacent faces 212' and 216' of components 212 and 216 are arranged parallel with each other at slight spacing and at an angle of 5° to 10° with respect to the wheel plane. This inclination with respect to the wheel plane X (FIG. 2) exhibited by the faces 212' and 216' (FIG. 6) which positively wedge together under compressive stress, assists the closing function of the bonnet 205 during its deformation under impact, by reason of the complementary configurations of the neighbouring hollow components which causes an interlock in the sense of preventing the bonnet from flying upwards. The same holds good for the configuration of the hollow structural components 312, 315 or of their corresponding contact faces 312', 316' which (seen in cross-section) form an obtuse angle of meshing to maintain the bonnet 305 closed. It also applies to the configuration according to FIGS. 9, 10, 11. As regards FIGS. 8 to 11, the hollow structural components according to the invention are shown in co-operation with an engine bonnet 405, 505, 605, and 705 respectively spanning across the front wing. In FIG. 8, the hollow component 412 (forward right, seen in direction of travel) is secured to the wheel arch 110 and its longitudinal face 412' corresponds to the longitudinal face 416' of the hollow component 416 partially forming the outer edge of the engine bonnet 405. Reference numeral 104 designates the forward right-hand wing.

In FIG. 9, the inter-meshing faces 512' and 516' of two correlated hollow components 512 and 516 are arranged inclined to the wheel plane similar to the configuration in FIG. 6. In order that the hollow component 512 may form an excellent abutment against the hollow component 516 and against lateral forces which develop under compressive stress, it is connected to the wing 204 through a longitudinal plate 23.

In the arrangement according to FIG. 10, a further hollow component 24 is arranged to the underside of the bonnet parallel to a corresponding hollow component pair 612, 616, and again serves as counterbearing for the hollow component 612 in compressive stress conditions. In a collision there occurs between the two longitudinal sides 612', 612'', of the hollow component surfaces 612 and the neighbouring hollow component surfaces 616' and 24' a wedging action, so to speak, which leads to a constrained connection of the contact surfaces and then to energy-absorbing collapse of the hollow components.

Figure 12:
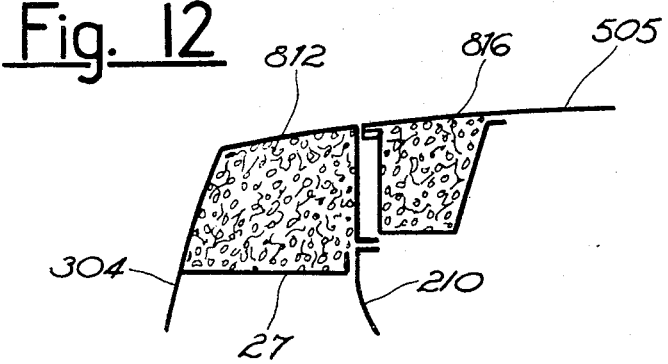
FIG. 12 is a further schematic showing of two neighbouring hollow components.

FIG. 11 shows hollow components 712, 716 having sides 712' and 716', respectively, with several ledges 25, 26 welded on at a distance from each other and extending over the entire length of the contact surfaces, to increase the constrained connection operation under compressive stress. In FIG. 12 is shown how, instead of an additional bodywork side hollow component, a space divided off by a transverse sheet 27 between wing 304 and wheel arch 210 fulfils the function of a hollow component 812 in analogous manner. 816 indicates the hollow component correspondingly arranged on the bonnet 505.

We claim:

1. In a vehicle body having a body compartment including an exterior opening and a pivoted exterior closure received within the body compartment opening, the combination comprising, spaced pairs of generally elongated energy absorbing members extending generally longitudinally of the body, the members each having a vertical face, one member of each pair being mounted on and in addition to the body compartment and the other member of the pair being mounted on and in addition to the closure, with the vertical faces of the members located in adjacent laterally juxtaposed relationship, each pair of energy absorbing members and the closure and body compartment collapsing longitudinally of the body under longitudinal impact loads applied thereto, the vertical faces of the members deforming laterally of the body into wedging engagement with each other upon such collapse, the wedging engagement of the pairs of members laterally interlocking the closure and the body compartment and maintaining the closure within the body compartment opening.

2. In a vehicle body having a body compartment including an exterior opening and a pivoted exterior closure received within the body compartment opening, the combination comprising, spaced pairs of generally elongated energy absorbing members extending generally longitudinally of the body, each member including a hollow elongated structure substantially filled with compressible plastic foam and having a vertical face, one member of each pair being mounted on and in addition to the body compartment and the other member of the pair being mounted on and in addition to the closure, with the vertical faces of the members located in adjacent laterally juxtaposed relationship, each pair of energy absorbing members and the closure and body compartment collapsing longitudinally of the body under longitudinal impact loads applied thereto, the vertical faces of the members being deformed laterally of the body into wedging engagement with each other under the pressure of the plastic foam being compressed within the elongated structures, the wedging engagment of the pairs of members interlocking the closure and the body compartment and maintaining the closure within the body compartment opening.

3. In a vehicle body having a body compartment including an exterior opening and a pivoted exterior closure received within the body compartment opening, the combination comprising, spaced pairs of generally elongated energy absorbing members extending generally longitudinally of the body, one member of each pair being mounted on and in addition to the body compartment and the other member of the pair being mounted on and in addition to the closure, each pair of members having vertical faces complementary in configuration and located in adjacent laterally juxtaposed relationship to each other, each pair of energy absorbing members and the body compartment and closure collapsing longitudinally of the body under longitudinal impact loads applied thereto, the vertical faces of the members deforming laterally of the body into wedging engagement with each other upon such collapse, the wedging engagement of the complementary vertical faces of the members laterally interlocking the closure and the body compartment and maintaining the closure within the body compartment opening.

* * * * *